May 16, 1961 C. F. WOLTERS ET AL 2,984,531
CARD FILE CONVEYOR

Filed May 21, 1957 7 Sheets-Sheet 1

INVENTORS
NIELS Y. ANDERSEN, DEC.
BIRTE YDE ANDERSEN,
EXECUTRIX
CARL F. WOLTERS
BY
ATTORNEY.

May 16, 1961 C. F. WOLTERS ET AL 2,984,531
CARD FILE CONVEYOR

Filed May 21, 1957 7 Sheets-Sheet 4

INVENTORS
NIELS Y. ANDERSEN, DEC
BIRTE YDE ANDERSEN,
EXECUTRIX
CARL F. WOLTERS
BY
ATTORNEY.

May 16, 1961

C. F. WOLTERS ET AL 2,984,531

CARD FILE CONVEYOR

Filed May 21, 1957

INVENTORS.
NIELS Y. ANDERSEN, DEC
BIRTE YDE ANDERSEN,
EXECUTRIX
CARL F. WOLTERS
BY

ATTORNEY.

May 16, 1961
C. F. WOLTERS ET AL
2,984,531
CARD FILE CONVEYOR
Filed May 21, 1957
7 Sheets-Sheet 6
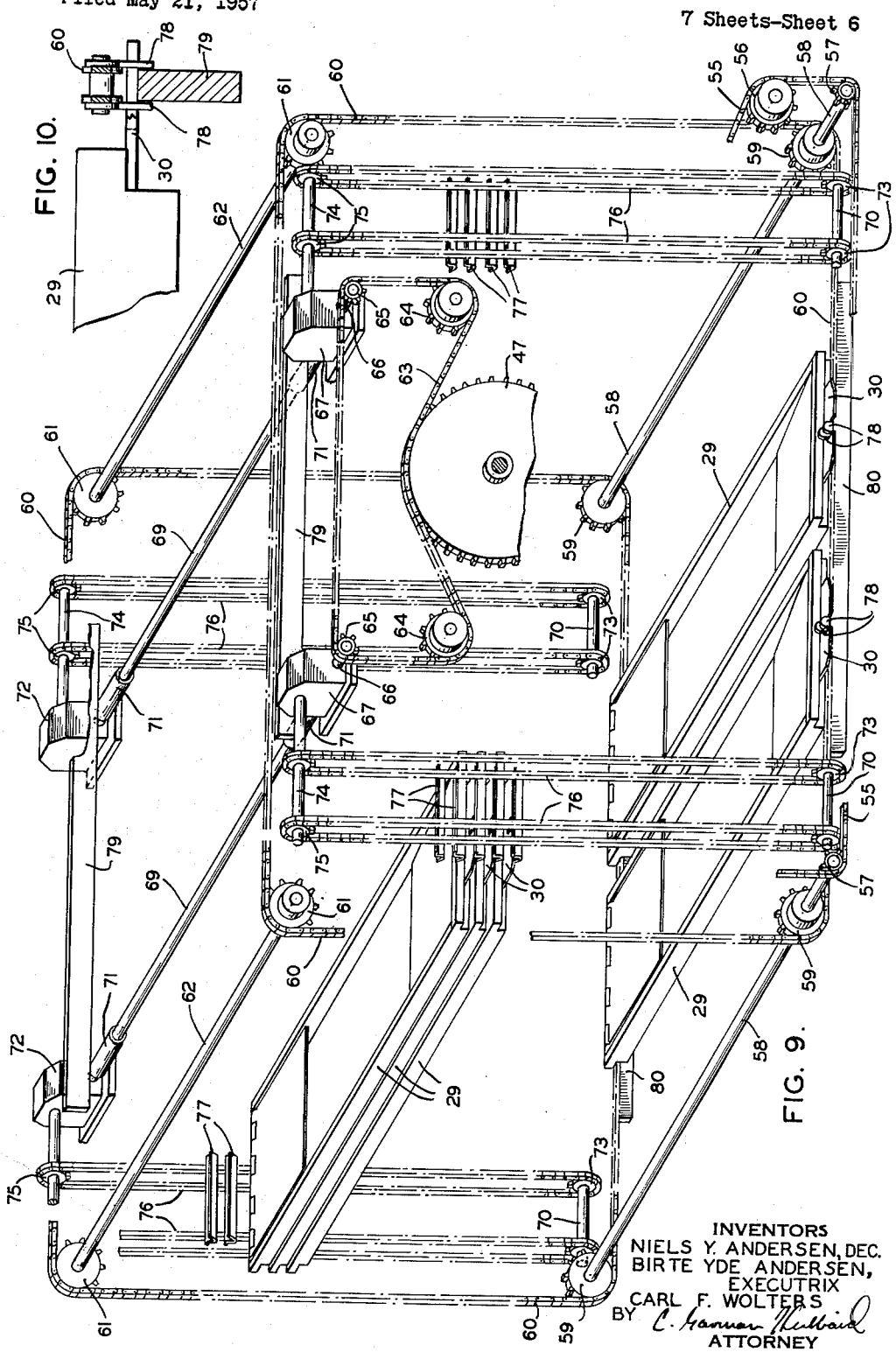
INVENTORS
NIELS Y. ANDERSEN, DEC.
BIRTE YDE ANDERSEN,
EXECUTRIX
CARL F. WOLTERS
BY
ATTORNEY

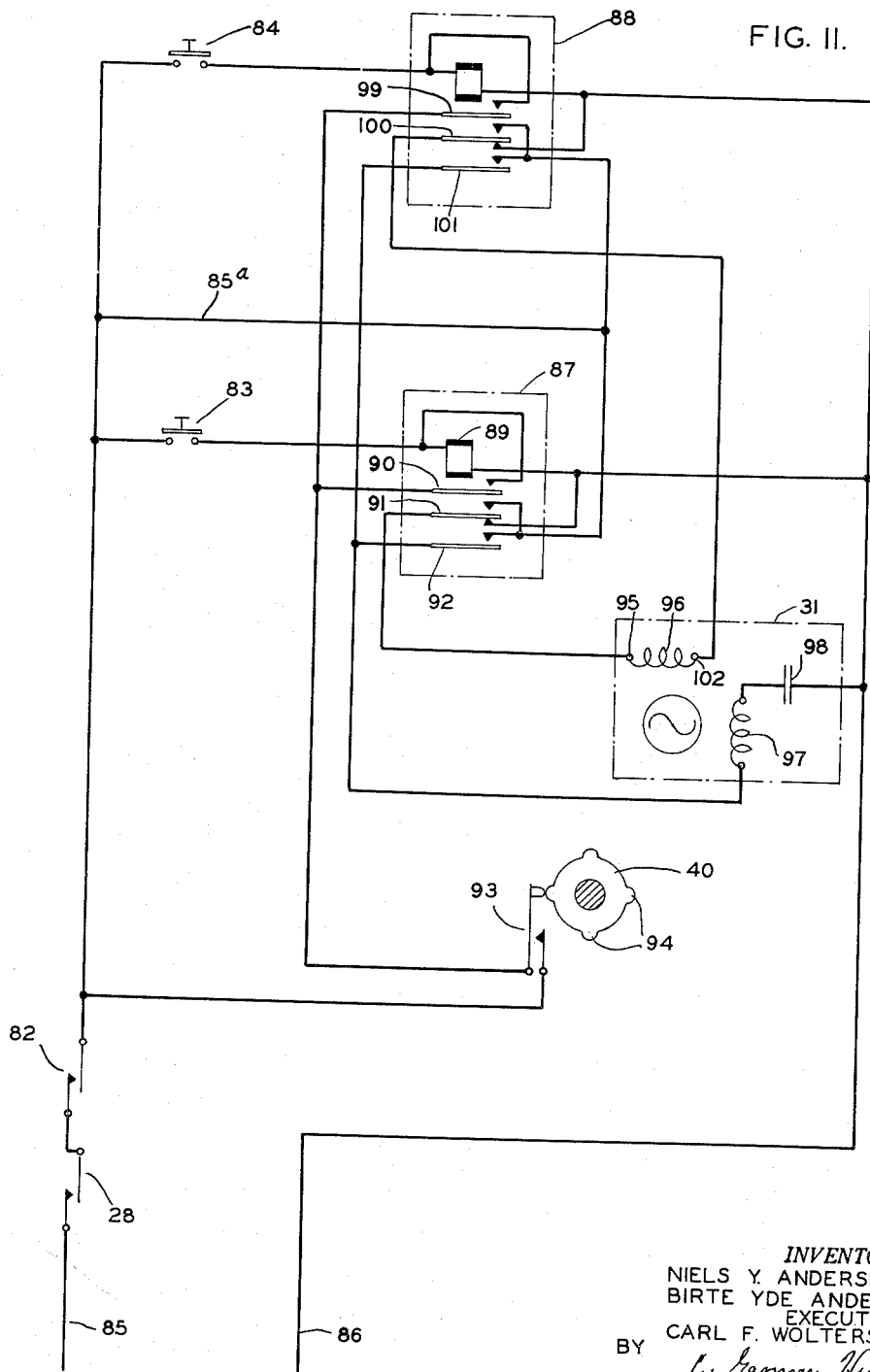

United States Patent Office 2,984,531
Patented May 16, 1961

2,984,531
CARD FILE CONVEYOR

Carl F. Wolters, New Canaan, Conn., and Niels Y. Andersen, deceased, late of Amherst, N.Y., by Birte Yde Andersen, executrix, Snyder, N.Y., assignors to Sperry Rand Corporation, New York, N.Y., a corporation of Delaware Filed May 21, 1957, Ser. No. 660,717

12 Claims. (Cl. 312—267)

This invention relates to power operated filing units, and particularly to the provision of such a unit for flat visible index card file trays containing overlapping inter-engaged card pockets for holding the respective cards.

File trays of this type are ordinarily housed in vertical cabinets which customarily are placed on desk level tables or supports. The trays are relatively long and ordinarily are withdrawn their full length from such conventional cabinets to permit overlying card pockets to lay back and thereby fully expose the card being consulted. In practice, a tray slightly below the one being consulted is ordinarily partially withdrawn also, so as to afford support for the tray being examined.

It has been found desirable to eliminate the manual effort required for tray withdrawal by one utilizing filing equipment of this type, and also to enable more than one tray to be fully exposed for convenient consultation thereof at one and the same time. It is also considered advantageous to enable all trays of a file to be examined from a single comfortable position of the user wherein a level writing surface is conveniently disposed and in close proximity to any one of the card trays being examined.

It is, therefore, an object of the invention to improve on cabinets for file trays of this type through means which facilitate reference to and use of the contents thereof.

It is a further object of the invention to facilitate reference to file trays of this type through means operating to automatically convey said trays to a conveniently located viewing or access station.

It is a further object of the invention to provide an endless conveying system for circulating file trays of this type while maintaining said trays continuously in level disposition.

It is a further object of the invention to provide a cabinet for file trays of this type wherein more than one tray may be consulted simultaneously and with a level writing surface disposed in close proximity thereto.

The above objects are carried out by provision of a desk form power operated file having capacity for several of such file trays in which all trays are consulted from a seated position at the same desk level and a pair of successive trays are exposed for simultaneous inspection with a level writing surface at either side of the two trays.

This invention provides a unit of this type having the appearance of a conventional twin pedestal desk but having unbroken exterior panel surfaces in place of the drawers.

The invention further provides a file in which any individual tray may be quickly and easily brought to the viewing position by the operator by merely holding the conveying mechanism actuated until it appears.

Further objects, together with the features contributing thereto and advantages accruing therefrom, will become apparent from the following description when read in conjunction with the drawing, wherein Fig. 1 is a front perspective of a power operated filing unit according to the invention with the door panels open permitting reference to a pair of file trays;

Fig. 9 is an isometric view illustrating the conveyor mechanisms;

Fig. 10 is a detail view of part of the conveying mechanism; and

Fig. 11 is a wiring diagram of the electrical control circuits.

Figure 1:
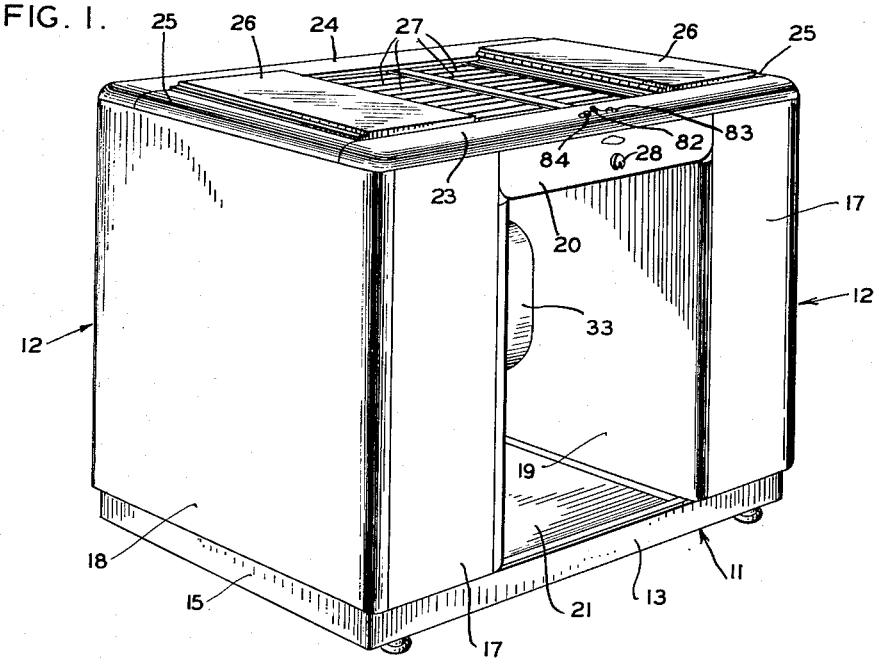

The appearance, construction, and working of an embodiment of the invention as illustrated in the drawing will now be described:

The filing unit, as seen in Fig. 1, is composed of a base 11 supporting two spaced pedestal sections 12, 12 joined at the top, the space between the pedestals and the top and bottom sections joining the pedestals forming a knee-hole well for the operator.

Figure 2:
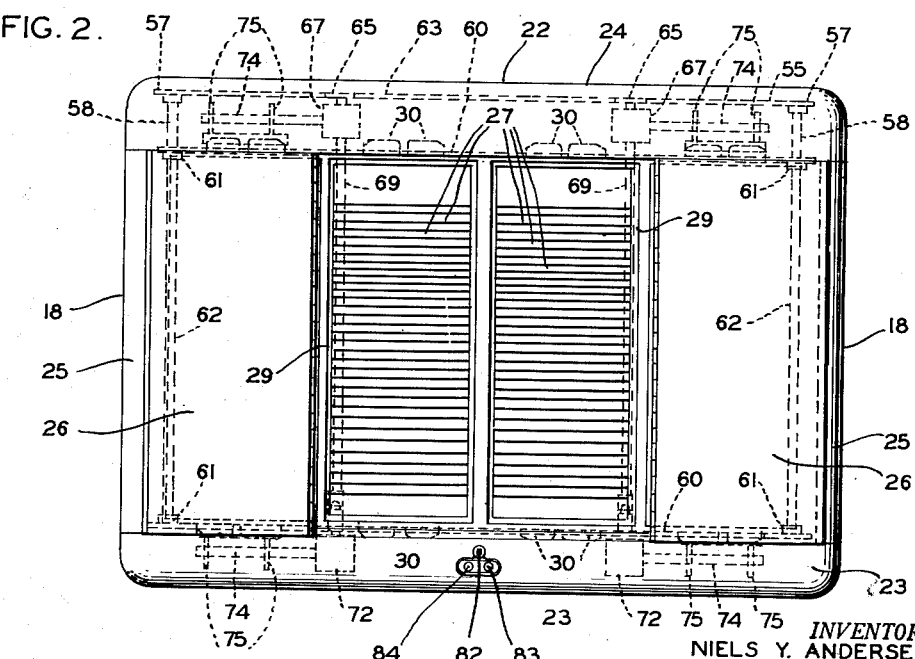
Fig. 2 is a top plan view of the unit with the door panels open.

The frame of filing unit is conventionally constructed of sheet metal plates and angle and channel members. The parts are joined by bolting, riveting, or welding to form a rigid cabinet structure. Base 11 is framed by a front sill 13, a rear sill 14, and two side sills 15. Two upright flanged plate members 16, bent along lines 16a to form vertical guide channels and disposed at the front and rear, respectively, of each pedestal form the main uprights of the structure. The whole unit is encased by sheet metal panels including front panels 17, side panels 18, and inner panels 19, enclosing the pedestals 12, center panel 20 covering the center joining section and folded under to form a ceiling for the knee-hole well, and floor panel 21 providing a floor for the knee-hole well. The rear of the unit is a single unbroken panel 22 covering a shallow compartment housing the main drive mechanism of the unit. The top is panelled in a similar manner by a narrow front border panel 23 mounting controls and a rear border panel 24. The center top section is covered by two end panels 25 and two centrally located doors 26, hinged to panels 25, allowing access to two trays of card pockets or holders 27, side by side. The corners of the panels are rounded and a smooth unobstructed exterior is thereby provided. Door panels 26, shown open in Figs. 1 and 2, are kept closed by lock 28, to prevent unauthorized access to the trays. Lock 28 may also operate a main switch to cut off the electric current to the controls, preventing movement of the trays when panels 26 are closed.

The card pockets 27 are removably mounted in trays or carriers 29, which are basically of open box like construction each having a split flange 30 on each end. The majority of the trays in any given position of the conveyor mechanism are housed in pedestals 12 as shown in Fig. 3, and are moved form one pedestal to the other through the hollow base and across the top, where they can be consulted by the conveyor mechanism operated through a Geneva type drive which will now be described.

The driving motor 31 is supported from a vertical web-plate 32, disposed at the rear of the knee-hole well, the motor being encased by a protective cover 33 protruding into the well. Motor 31, through coupling 34, (Fig. 3) drives a reducer 35. Motor 31 and reducer 35 are mounted in a cradle 36 on the front side of web plate 32. The cradle is supported on brackets 37, welded to the web plate, by rubber mounts 38 to reduce vibration. The shaft of the reducer passes through an opening in the web plate and mounts a small sprocket gear 39 on the opposite or rear side of the plate. Reducer sprocket 39 drives main drive sprocket 40 by means of chain 41. Main drive sprocket 40 is suitably journaled on a bearing 40a supported by and between web plate 32 and a spaced vertical channel plate 42 shown broken away in Fig. 3 and in section in Fig. 4. A drive bar 43 mounting rollers 44, 45 is securely fastened to the rear side of main drive sprocket gear 40 for intermittent alternate drive of horizontal conveyor drive sprocket 46 and vertical conveyor drive sprocket 47. Sprockets 46 and 47 are journaled between plates 32 and 42 in the same manner as main drive sprocket 40. A section of vertical conveyor sprocket 47 is broken away in Fig. 3 to show a portion of a star wheel 48 fastened to its front side. A similar star wheel 49 is fastened to the front side of horizontal conveyor sprocket 46, as shown also in Figs. 5, 6, and 7. Star wheels 48 and 49 each has four radial channels a, b, c, d, and e, f, g, h, respectively, at right angles to each other, of substantially the width of the diameter of rollers 44 and 45. Stop levers 50 and 51 are journaled between plates 32 and 42 in the same fashion as drive sprockets 40, 46, and 47, and are linked at one end by spring 52. A camming surface 53 and a stop nose 54 are provided on each of levers 50 and 51.

Figure 3:
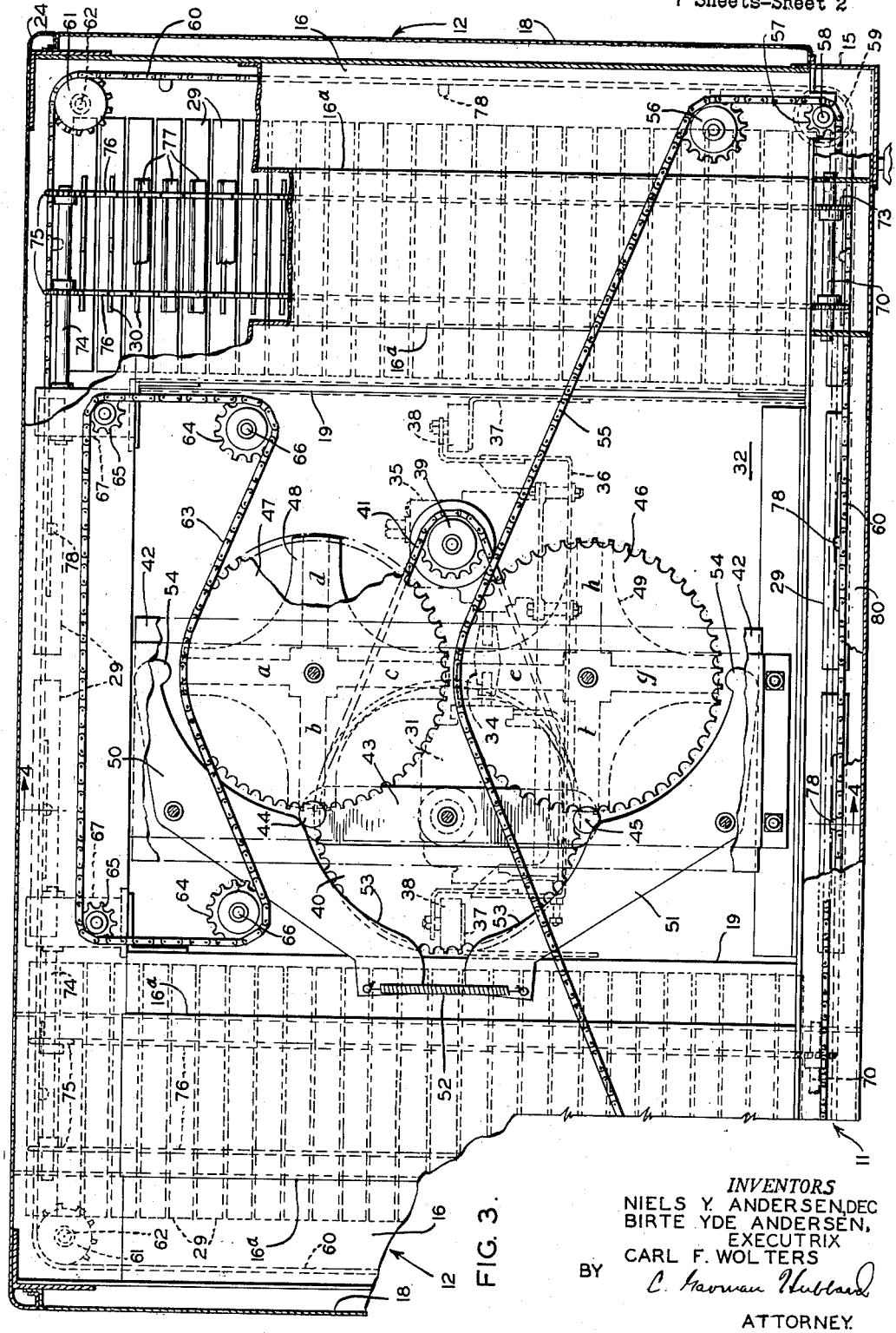
Fig. 3 is a rear view with the rear cover panel removed showing the operating mechanism.
Figure 4:
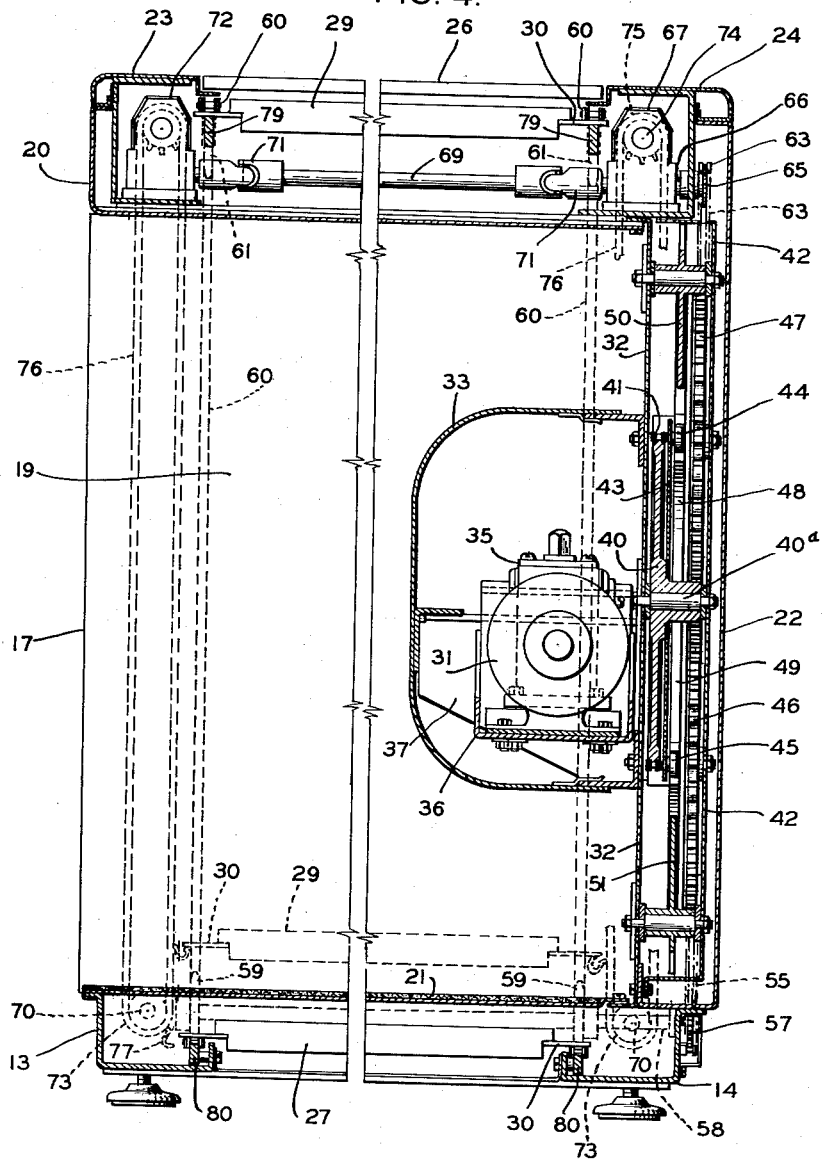
Fig. 4 is a cross section on line 4—4 of Fig. 3.
Figure 5:
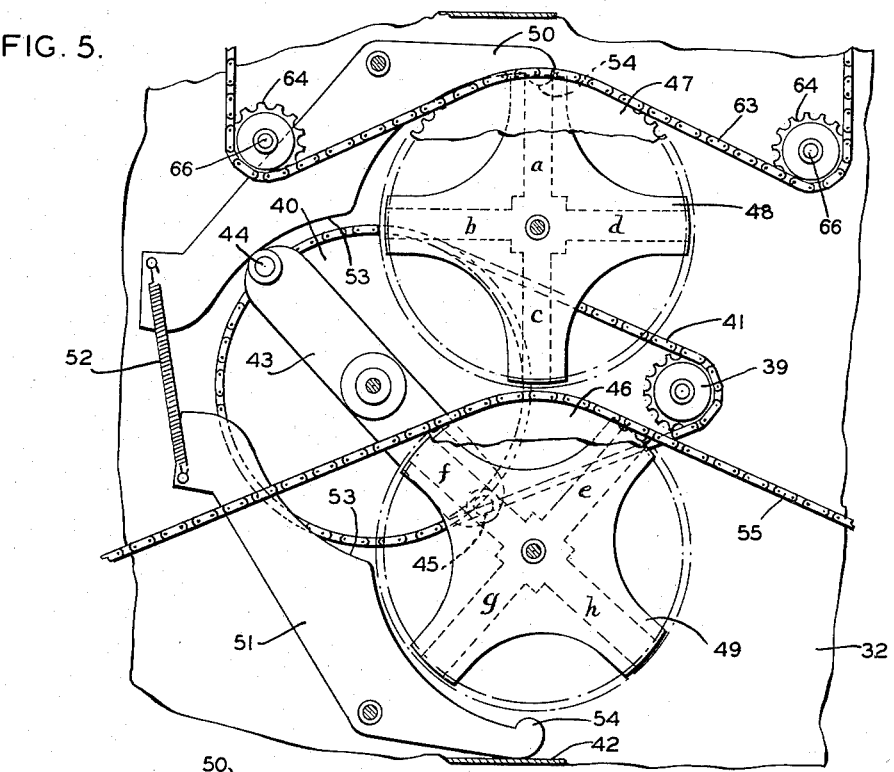
Fig. 5 is a view of the operating mechanism partly rotated in tray movement.

Figs. 3, 5, 6, and 7 illustrate the operation of the main drive mechanism of the conveyor systems. Fig. 3 shows the mechanism in a neutral stop position, and sprockets 46 and 47 locked against movement by rollers 44, 45 engaging the ends of channels b and f of star wheels 48 and 49, respectively. In Fig. 5 main drive sprocket 40, under the action of chain 41 driven by reducer sprocket 39, has rotated one eighth of a turn in a counterclockwise direction, as viewed from the rear. As drive bar 43 moves from its position in Fig. 3, roller 44, acting on the camming surface 53 of stop lever 50, rocks lever 50 clockwise about its bearing, causing nose 54 of lever 50 to enter channel a of star wheel 48 of vertical drive sprocket 47, thereby locking it against rotation. Spring 52, simultaneously acting on stop lever 51, pulls nose 54 of lever 51 away from star wheel 49 of horizontal drive sprocket 46. As roller 44 of drive bar 43 leaves channel a of star wheel 48, which is thereupon locked by nose 54 of stop lever 50 as described above, roller 45 enters channel f of star wheel 49, causing it to rotate in a clockwise direction, thereby moving horizontal conveyor drive chain 55 in the same direction. Chain 55 passes over a take-up sprocket 56 (Figs. 3, and 9) which is adjustable to control the tension, and rotates horizontal conveyor chain drive sprocket 57. Drive sprocket 57 is fast on a shaft 58, which is suitably journaled in the framework and extends to the front of the unit, in common with a pair of conveyor sprockets 59. A similar take-up sprocket 56 and horizontal conveyor drive sprocket 57, shaft 58 and pair of conveyor sprockets 59, are located on the lower opposite side of the unit. Front and rear horizontal conveyor chains 60, are driven by sprockets 59 and pass over respective pairs of sprockets 61, on shafts 62, located in the upper corners of the unit as seen best in Fig. 9.

Figure 6:
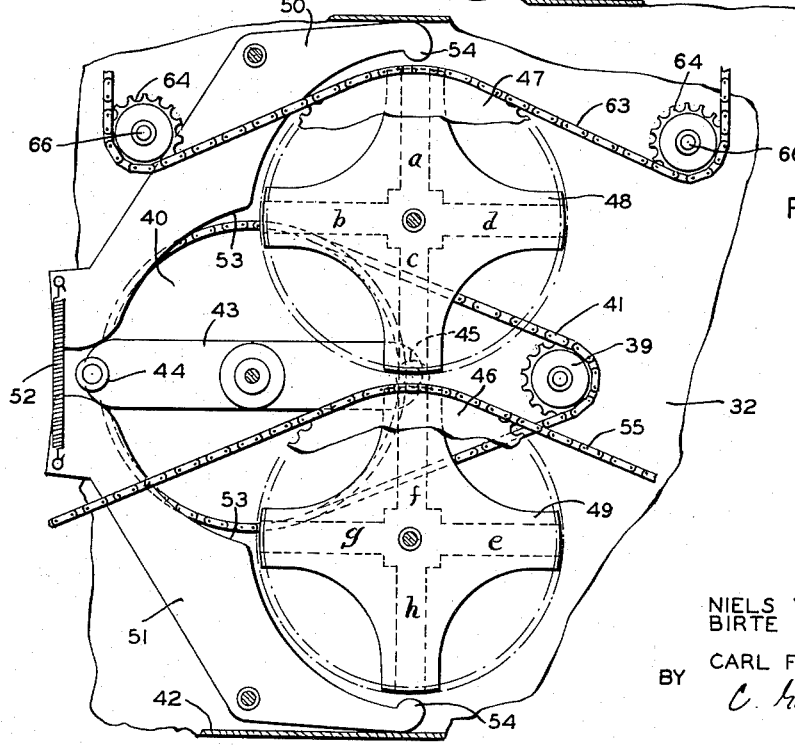
Fig. 6 is a view of the mechanism at a further point in a cycle of operation.

In Fig. 6 the drive mechanism is seen in another neutral stop position with drive bar 43 in a horizontal position and roller 45 partially in channels c and f of star wheels 48 and 49, respectively, preventing any substantial movement of either of the conveyor sprockets 46 and 47. As main drive sprocket 40 continues its rotation to the position shown in Fig. 7, roller 45 of drive bar 43 enters channel c of star wheel 48, causing vertical conveyor drive sprocket 47 to rotate in a clockwise direction, while roller 44, acting on camming surface 53 of stop lever 51, forces nose 54 of stop lever 51 into channel h of star wheel 49 locking it against rotation. At the same time spring 52 rocks nose 54 of stop lever 50 away from star wheel 48 and holds it out of contact.

Figure 7:
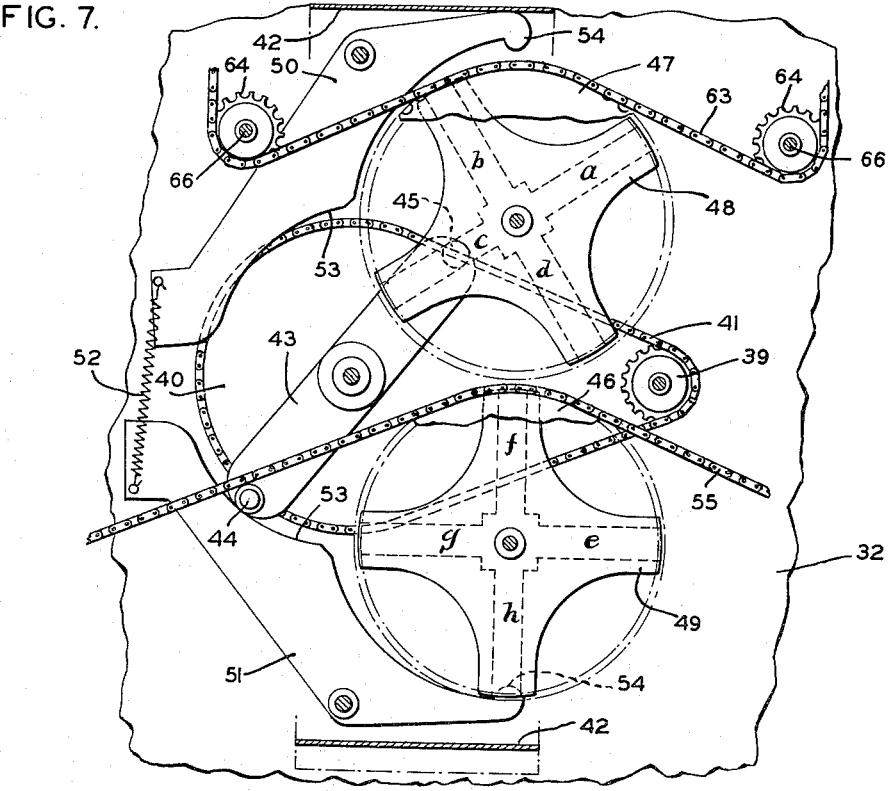
Fig. 7 shows a still further point in a cycle of operation of the mechanism.

Clockwise rotation of the vertical conveyor drive sprocket 47, as shown in Fig. 7, drives a vertical conveyor drive chain 63 in the same direction. Chain 63 passes over take-up sprockets 64, which are movable to adjust the tension in chain 63, and drives vertical conveyor worm drive sprockets 65 of which there is one for the vertical conveyor of each pedestal as shown best in Fig. 9, thereby driving the vertical conveyor system.

The vertical conveyor system comprises two conveyors, one in each pedestal, conveyor consisting of separate opposed front and rear sections, respectively. Since the vertical conveyor of one pedestal is substantially duplicated by that of the other pedestal, the description of one is believed sufficient. Worm drive sprocket 65 is fixed on the shaft 66 of a rear worm drive 67 which in turn is coupled by a shaft 69, and universal couplings 71, with a front worm drive 72. Head shafts 74, on which are fixed a pair of vertical conveyor chain sprockets 75, constitute extensions of the output shafts on worm drives 67, 72, respectively. Corresponding tail shafts 70, each carrying a pair of sprockets 73, at the lower end of each vertical conveyor section, carry endless chains 76. The head and tail shafts of each vertical conveyor are journaled in bearings mounted on flanges 16a of the vertical channel frame members 16.

The two head shafts 74 driven by coupled worm drives 67, 72, respectively, rotate in opposite directions from one another so that the inner reaches of each pair of conveyor chains 76, driven by coupled worm drives 67, 72, always travel in the same direction at the same rate of speed, for level transport of the tray carriers. The worm drives 67, 72 for one pedestal are of reverse design to those for the other pedestal so that the trays in each pedestal move simultaneously in opposite directions.

It will be readily understood from the foregoing description that the horizontal and vertical conveyor systems are driven alternately and that only one conveyor system operates at any one time. Each conveyor may also be moved in an opposite or reverse direction merely by reversing the motor. Each pair of vertical conveyor chain 76 driven by paired sprockets 75 have secured thereto, at suitably spaced intervals, horizontally disposed carrier support lips 78 which engage the bottom surface of the carrier flanges 30 to thereby support and transport the trays within and through the respective pedestals. The front and rear horizontal conveyor chains 60 are provided with a pair of drag links 78 replacing the normal side links at regular intervals along the chains and adapted to engage in the split of the flanges 30 of the carriers. In passing the opening in the top section of the desk, flanges 30 of tray carriers 29 slide on a pair of front and rear guide rails 79, shown best in Figs. 8, 9, and 10, aligned with conveyor chains 60 and of substantially the same width as the space between a pair of drag links 78. Carriers 29 are moved along rails 79 by drag links 78 which when fit into the gaps between the flanges, as shown in Fig. 10, embrace the sides of rails 79 to guide the chains 60.

Figure 8:
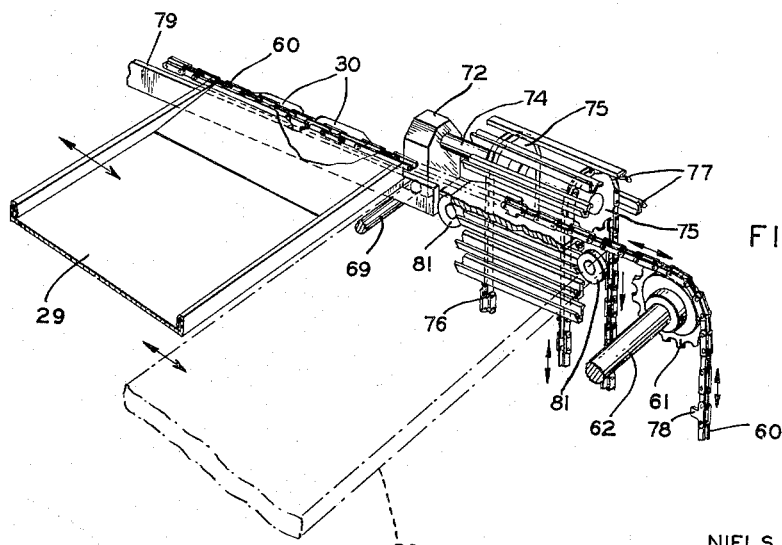
Fig. 8 is a perspective view showing the tray transfer operation of the conveyor systems.

The gearing of the horizontal conveying system is such that a quarter revolution of the horizontal conveyor drive sprocket 46 moves a tray carrier 29 one full step, for example, from the position shown in solid lines in Fig. 8, to the position shown in dot-dash outline, where the flanges at each end of the carrier are supported by a pair of lips 77, one on each of the vertical conveyor sections in that pedestal. The two other carriers 29 seen at the top of the unit in Fig. 3 would also be moved one space to the right, leaving a vacant tray position at the top of the other pedestal. In the same fashion the three carriers in the lower part of the horizontal conveyor will be moved one step to the left leaving a vacant tray position at the bottom of the right hand pedestal as viewed in Fig. 3. In the bottom of the unit, the horizontal conveyor chains 60 bear on respective guide rails 80 extending between the vertical conveyors of the respective pedestals while tray carrier flanges 30 rest directly on the chain as the carrier flanges are engaged in the same manner as above by drag links 78. When the carriers have moved one position as described, the horizontal conveyor drive is stopped, and if the motor continues to run, the main drive sprocket now drives vertical conveyor drive sprocket 47 which operates to lower the carriers in the right hand pedestal as viewed in Fig. 3 one level or step as drive sprocket 47 rotates one quarter of a turn, while the vertical conveyor in the other pedestal, oppositely driven, raises all the carriers one step in a corresponding fashion.

To insure accurate centering of tray carriers 29 for registry of drag links 78 with slotted flanges 30, a pair of rollers 81 is provided at each tray transfer point between a vertical conveyor section and a horizontal conveyor chain as shown in Fig. 8. Each pair of rollers 81 is spaced apart substantially the width of flanges 30, and upper pairs of rollers 81, as shown in Fig. 8, have their uppermost points substantially on the same plane as the upper edge of guide rail 79. When the vertical conveyor as shown in Fig. 8 moves upward, flanges 30 of a tray carrier 29, carried on lips 77 of that conveyor section and the corresponding conveyor section, not shown, at the other end of the pedestal, pass between rollers 81 and are centered so that a pair of drag links 78 enter the slot in each flange 30 as the conveyor comes to rest for transfer of tray carrier 29 to the horizontal conveyor system. Horizontal conveyor chains 60 thereupon move to the left, sliding tray carrier 29 off lips 77, by means of drag links 78, and the flanges 30 ride over inner rollers 81 and on to the guide rails 79. In the opposite direction of tray and conveyor travel, rollers 81 at the lower transfer points are located just above the transfer point and act in the same way as the upper rollers to ensure engagement of the flanges with drag links 78.

Any conventional type of fractional horsepower reversible motor may be used to operate the unit, preferably having good starting characteristics. Fig. 11 shows a circuit for use with a single phase capacitor induction motor.

Lock 28 on center panel 20 also serves as a main switch. The other controls for operating the filing unit are grouped together at the center of front panel 23, comprising a line switch 82 and a pair of push buttons 83 and 84, for clockwise and counterclockwise circulation of trays, respectively, from the operator's view point. Power from a normal lighting circuit is led into the unit by lines 85 and 86.

Assuming that both switches 28 and 82 are closed, push buttons 83 and 84 control the starting and direction of rotation of motor 31 through relays 87 and 88, respectively. Depressing button 83 closes the circuit from line 85 to coil 89, energizing it, and actuating switch contacts 90, 91 and 92. Contact 90 closes a holding circuit to one side of normally closed microswitch 93, located on the rear of web-plate 32 so that it may be opened by cams 94 spaced 90° apart on a concentric radius on main drive sprocket 40. Microswitch 93 and cams 94 are positioned so that the switch is opened, breaking the circuit and stopping the motor, each time main drive sprocket 40 comes into a neutral stop position.

Contact 91, when actuated closes a circuit from line 85, through 85a to terminal 95 of main winding 96 of motor 31. This circuit is completed from terminal 102 to line 86 through contact 100 of relay 88. Contact 92 when actuated completes a circuit through starting winding 97. Capacitor 99 between line 86 and starting winding 97 acts in a well known manner to give an increased starting voltage to motor 31 when these two circuits are closed to start the motor. Movement of sprocket 40, as motor 31 starts, allows microswitch 93 to close, completing the holding circuit to coil 89 through contact 90. Momentary depression of button 83 therefore serves to start the motor and initiate a single step of tray movement. A 90° rotation of sprocket 40 breaks the holding circuit by means of a cam 94 opening microswitch 93.

Depressing button 84 operates relay 88 for control in a similar manner, contact arm 99 closing a holding circuit to switch 93, arm 100 connecting line 85 to terminal 102 of main motor winding 96 which circuit completes to line 86 through contact 91 of relay 87, and arm 101 completing a circuit to starting winding 97. It will readily be seen, however, that the opposite direction of current flow through main winding 96 will now reverse the direction of rotation of motor 31.

The filing unit may of course be operated for longer period, to bring a distant rather than proximate tray into view, by merely holding a button depressed until the tray appears.

The Geneva type drive mechanism of this invention affords a smooth intermittent motion for the two conveyor systems, imparting a gradual acceleration to a conveyor to the mid-point of a step of movement, the rate of rotation thereupon diminishing to the completion of the step, when the conveyor comes to rest again and is locked against further movement. The system of take-up sprockets to maintain tension in the chain insures a quick response to the controls without any slack or lost motion to be taken up before movement occurs. The reduction between the motor and final drive by means of the reducer and chain drive to the main drive sprocket allows the motor to start immediately although under constant load and provides for quiet operation of the mechanism. A low noise level is also maintained by the use of chain and worm drives throughout the unit.

While we have described what we consider to be a highly desirable embodiment of our invention, it is obvious that many changes in form could be made without departing from the spirit of our invention, and we, therefore, do not limit ourselves to the exact form herein shown and described, nor to anything less than the whole of our invention as hereinbefore set forth, and as hereinafter claimed.

What we claim as new, and desire to secure by Letters Patent, is:

1. A desk form filing unit of the type described comprising a pair of spaced pedestal units, upper and lower interconnecting sections joining said pedestal units and communicating interiorly therewith to define a closed circulation path, a plurality of file trays horizontally disposed throughout said circulation path, means operative to circulate said file trays throughout said circulation path, said circulating means including a horizontal conveyor extending through said interconnecting sections and a vertical conveyor extending through each of said pedestal units, each conveyor including a pair of spaced endless members disposed in parallel opposed relation at opposite sides of said sections and pedestals respectively, each of said endless members including tray engaging elements spaced thereon to maintain trays in close proximity to one another in the direction along which the respective conveyor travels, each vertical conveyor operating to deliver a tray to said horizontal conveyor, said horizontal conveyor operating to deliver a tray to each of said vertical conveyors, and drive means including a star wheel for each form of conveyor each wheel being singly and intermittently driven in Geneva motion by a common driver for operating said conveyors in mutually exclusive movement alternately, whereby continuous energization of said drive means is effective for circulating said trays from one form of conveyor to another in endless seccession through said circulation path.

2. An endless file-card conveying system for circulating file card trays in continuous horizontal disposition comprising two vertical conveyors and a horizontal conveyor, each vertical conveyor including a pair of opposed flexible endless members having a common actuator, the opposed reaches of each pair of said members being operated in the same direction, each of said vertical conveyors being operated by said common actuator in opposite direction to the other, said horizontal conveyor including a pair of opposed flexible endless members each extending between the upper and lower limits of associated endless members of the respective vertical conveyors, the opposed members of said horizontal conveyor being operated by a separate common actuator, a plurality of tray engaging elements arranged along said horizontal conveyor and spaced in accordance with the width of said trays, a plurality of tray supporting elements arranged along said vertical conveyors and spaced thereon in accordance with the depth of said trays, and means including star wheel members intermittently operated in Geneva motion for driving said separate actuators in alternate steps of operation, each operational step of said horizontal conveyor being effective to deliver and remove respectively a tray to and from each of said vertical conveyors, each operational step of said vertical conveyors being effective to deliver and remove respectively a tray to and from said horizontal conveyor, whereby continued energization of said driving means operates to circulate said trays serially from one to another conveyor in endless succession.

3. The invention according to claim 2, wherein said conveyors are supported and housed within a desk shaped cabinet, said cabinet being provided with an opening disposed to give access to trays carried by said horizontal conveyor.

4. The invention according to claim 3, wherein said conveyors are supported and housed in a desk shaped cabinet, said cabinet comprising spaced pedestals joined by interconnecting sections communicating interiorly therewith at the upper and lower extremities of said pedestals and defining an open knee-hole area therewith, each said pedestal containing one of said vertical conveyors, said interconnecting sections of said cabinet containing portions of said horizontal conveyor.

5. The invention according to claim 2, wherein said driving means and said separate actuators are reversible, whereby said trays may be circulated in either one or another direction depending upon the direction of energization of said driving means.

6. The invention according to claim 2, wherein said trays are formed at opposed ends thereof with vertically split horizontally extending flange members and wherein the tray engaging elements of said horizontal conveyor are inwardly projecting drag members adapted to fit in the split portion of said flange members, each operational step of a vertical conveyor carrying the flange members of a tray into fitting engagement with corresponding drag members to transfer a tray to said horizontal conveyor.

7. The invention according to claim 6, wherein said horizontal conveyor includes ridge support bars underlying the horizontal reaches of the endless members thereof and wherein a said drag member comprises a pair of spaced apart projections adapted to embrace said support bars to maintain longitudinal alignment of the flexible endless members of the horizontal conveyor.

8. The invention according to claim 2, wherein said trays are formed at opposite ends thereof with horizontally extending flange members and wherein the tray supporting elements of said vertical conveyors comprise horizontally disposed lip members adapted to underlie said flange members, each operational step of said horizontal conveyor carrying the flange members of a tray into supporting engagement with a corresponding pair of said lip members to transfer a tray to a vertical conveyor.

9. The invention according to claim 8, wherein each endless member of a vertical conveyor comprises a pair of flexible endless elements disposed in parallel relation to each other around common axis, and wherein each said lip member is secured to both said paired elements of an endless member to retain the lip member in horizontal disposition when supporting one of said trays.

10. In a circulating system of the type described comprising a plurality of separately driven conveyors intermittently operable through a succession of steps of movement, Geneva type drive means comprising an actuator for each of said conveyors, each of said actuators being a driven member of said drive means and including star wheel means integral therewith, and a drive member common to both said actuators, said star wheel means being disposed for successive driving engagement by said drive member, whereby said actuators are driven alternately during a cyclic movement of said drive member.

11. The invention according to claim 10, wherein said drive member includes individual wheel engaging elements disposed thereon in diametric opposition, and wherein said separate star wheel means are disposed for driving engagement by one of said elements within a half cycle operation of said drive member, whereby each of said actuators are twice driven in alternate succession during one cyclic operation of said drive member.

12. The invention according to claim 11, wherein said drive means includes a separate detent member operative for restraining the movement of the separate star wheel means and disposed for operative engagement by said elements, the detent member for one of said star wheel means being operated by one of said elements during that portion of a cycle of said drive member wherein the other element is in driving engagement with the other of said star wheel means.

References Cited in the file of this patent

UNITED STATES PATENTS

| | | |
|---|---|---|
| 1,123,934 | Schrafft, et al. | Jan. 5, 1915 |
| 2,729,531 | Anderson | Jan. 3, 1956 |